United States Patent
Roberg

[11] Patent Number: 6,027,407
[45] Date of Patent: Feb. 22, 2000

[54] REPLACEABLE COMPONENTS FOR COMBINES

[75] Inventor: Alfons Roberg, Harsewinkel, Germany

[73] Assignee: CLAAS Selbstfahrende Erntemaschinen GmbH, Harsewinkel, Germany

[21] Appl. No.: 09/076,208

[22] Filed: May 12, 1998

[30] Foreign Application Priority Data

May 14, 1997 [DE] Germany .................. 197 20 074

[51] Int. Cl.⁷ .................................................. A01F 7/06
[52] U.S. Cl. ................................................. 460/80; 460/71
[58] Field of Search .............................. 460/80, 81, 83, 460/71, 63, 69, 66, 75

[56] References Cited

U.S. PATENT DOCUMENTS

| | | | |
|---|---|---|---|
| 3,512,533 | 5/1970 | Loewen | 460/71 |
| 3,664,100 | 5/1972 | Rowland-Hill | 56/14.6 |
| 3,982,549 | 9/1976 | De Pauw et al. | 130/27 T |
| 4,178,943 | 12/1979 | West | 130/27 T |
| 4,535,787 | 8/1985 | Underwood | 130/27 T |
| 4,964,838 | 10/1990 | Cromheecke et al. | 460/80 |
| 4,976,654 | 12/1990 | Dammann et al. | 460/80 |
| 5,769,711 | 6/1996 | Roberg | 460/73 |
| 5,913,724 | 6/1999 | Roberg | 460/71 |

FOREIGN PATENT DOCUMENTS

| | | |
|---|---|---|
| 0 057 380 A1 | 1/1982 | European Pat. Off. . |
| 33 19 138 A1 | 12/1983 | Germany . |
| 196 00 390 A1 | 12/1996 | Germany . |
| 196 40 047 A1 | 4/1998 | Germany . |

*Primary Examiner*—Thomas B. Will
*Assistant Examiner*—Arpad Fabian Kovacs
*Attorney, Agent, or Firm*—Husch & Eppenberger, LLC; Robert E. Muir

[57] ABSTRACT

In a combine harvester comprising a separating device which operates by the axial flow method, a chopping device which operates by the axial flow method designed in such a way that the components of the separating rotor's chopping device can be replaced in a very simple manner and are kept to a minimum. In the combine harvester according to the invention, the impact teeth, arranged in a spirally or helically extending row, form a one-piece impact tooth functional part which can be replaced as one single piece. One-piece filler bodies located between the individual rows of impact teeth are provided with cutting channels which are entered by the chopper blades on rotation of the rotor. The impact teeth are also provided with cutting grooves to reduce the length of the chopped material. The combine harvester is particularly designed for harvesting cereal.

15 Claims, 5 Drawing Sheets

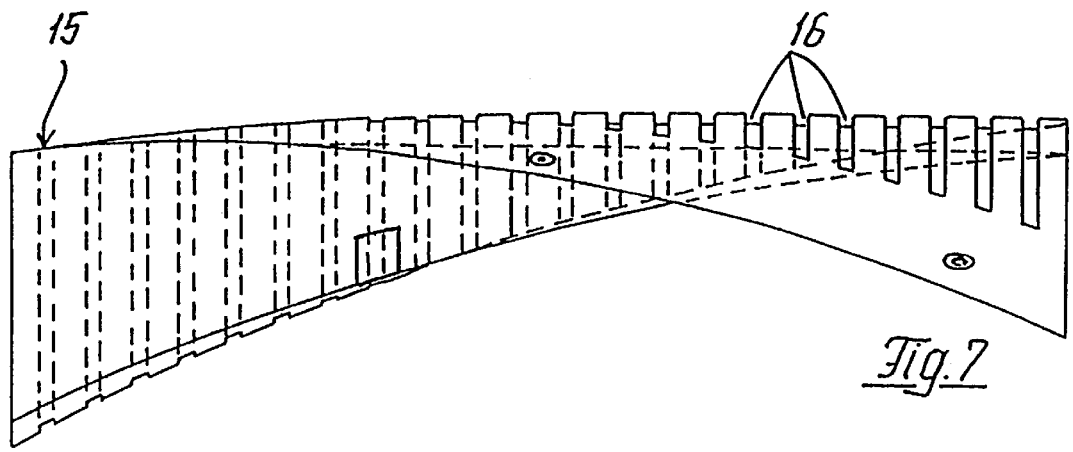
_Fig. 7_
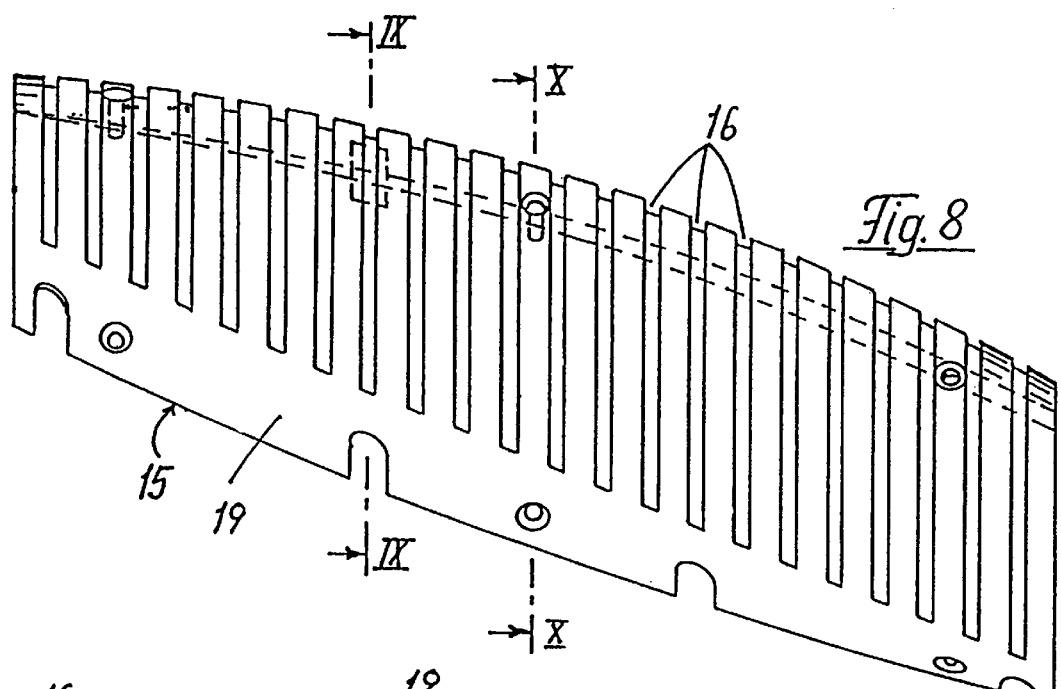
_Fig. 8_
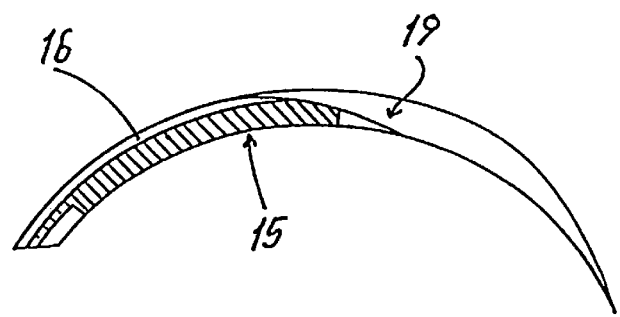
_Fig. 9_
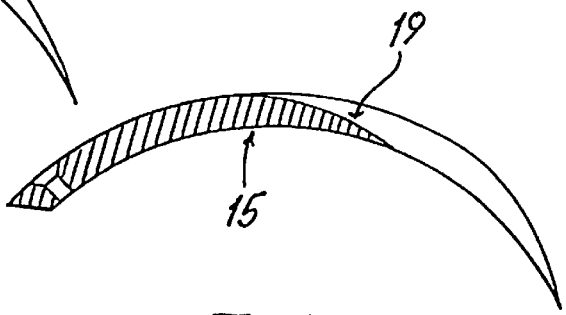
_Fig. 10_

REPLACEABLE COMPONENTS FOR COMBINES

BACKGROUND OF THE INVENTION

The present invention relates generally to agricultural machinery and, more particularly, to improvements to combine harvesters for crops.

The invention relates to a combine harvester having a cutterbar and a sloping conveyor or elevator which transports the cut material to a tangential or axial threshing mechanism mounted behind the sloping conveyor. The threshing mechanism is adjoined in the direction of flow of material by at least one separating device which operates by the axial flow method and which includes a separating rotor which can be rotatably driven. The separating rotor is equipped circumferentially with spirally or helically extending conveying elements and is surrounded by a housing which includes an upper cover and a lower separating cage. The conveying elements are formed from impact teeth which continue the spiral or helix and between which are located radial slots which, if required, cooperate with stationary chopper blades associated with a recess of the housing.

From German Patent Publications 19600390 and 19640047 are known combine harvesters having a separating rotor in the region of the chopper device and which is surrounded by a plurality of cutting channel-forming supporting rings with impact teeth which are welded or bolted to the rotor casing. A sleeve-like element which covers the region of the chopper device is fitted and fixed on the rotor. Cutting channels are formed in and all around the outer wall of the sleeve-like element. Impact teeth are affixed to or formed integrally with the resulting channel webs. A proposed alternative is to fit a sleeve-like component as a connecting unit between two parts of the rotor casing. The sleeve-like parts can also be constructed as a casting, which integrally forms the cutting channels and the impact teeth. Initial assembly and required service work, such as replacing wearing parts, of these above-described separating rotors for chopping crop material is possible only with considerable time and hence cost-intensive work which requires the whole separating rotor having to be detached from its end bearings.

It is an object of the invention to overcome one or more of the above described difficulties. Another object is to design a combine harvester of the kind described whose components can be exchanged in a very short time, particularly when repair work is necessary, and whose components constitute, if possible, a small circumference of the whole chopper device. Another object of the invention is to provide a solution to simplify the manufacture of the type of combine harvester described herein.

SUMMARY OF THE INVENTION

A combine harvester for harvesting crops and having a cutterbar; a sloping conveyor which transports the cut material away; a threshing mechanism mounted behind the sloping conveyor; a separating device including a separating rotor having a main body and equipped with spiral conveying elements; a plurality of impact teeth which form a continuation of the spiral conveying elements of each separating rotor within a given region of the conveying zone and continue the spiral; a plurality of radial slots located between the impact teeth; an impact tooth functional part forming a spirally extending row of the impact teeth, and means for releasably attaching the impact tooth functional part to the main body of the separating rotor.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 7 is a view of an individual filler body utilized in FIG. 2 in a side view;

FIG. 8 is a top view of the filler body shown in FIG. 7;

FIGS. 9 and 10 are cross sectional views taken along lines IX—IX and X—X respectively in FIG. 8;

DETAILED DESCRIPTION

Figure 1:
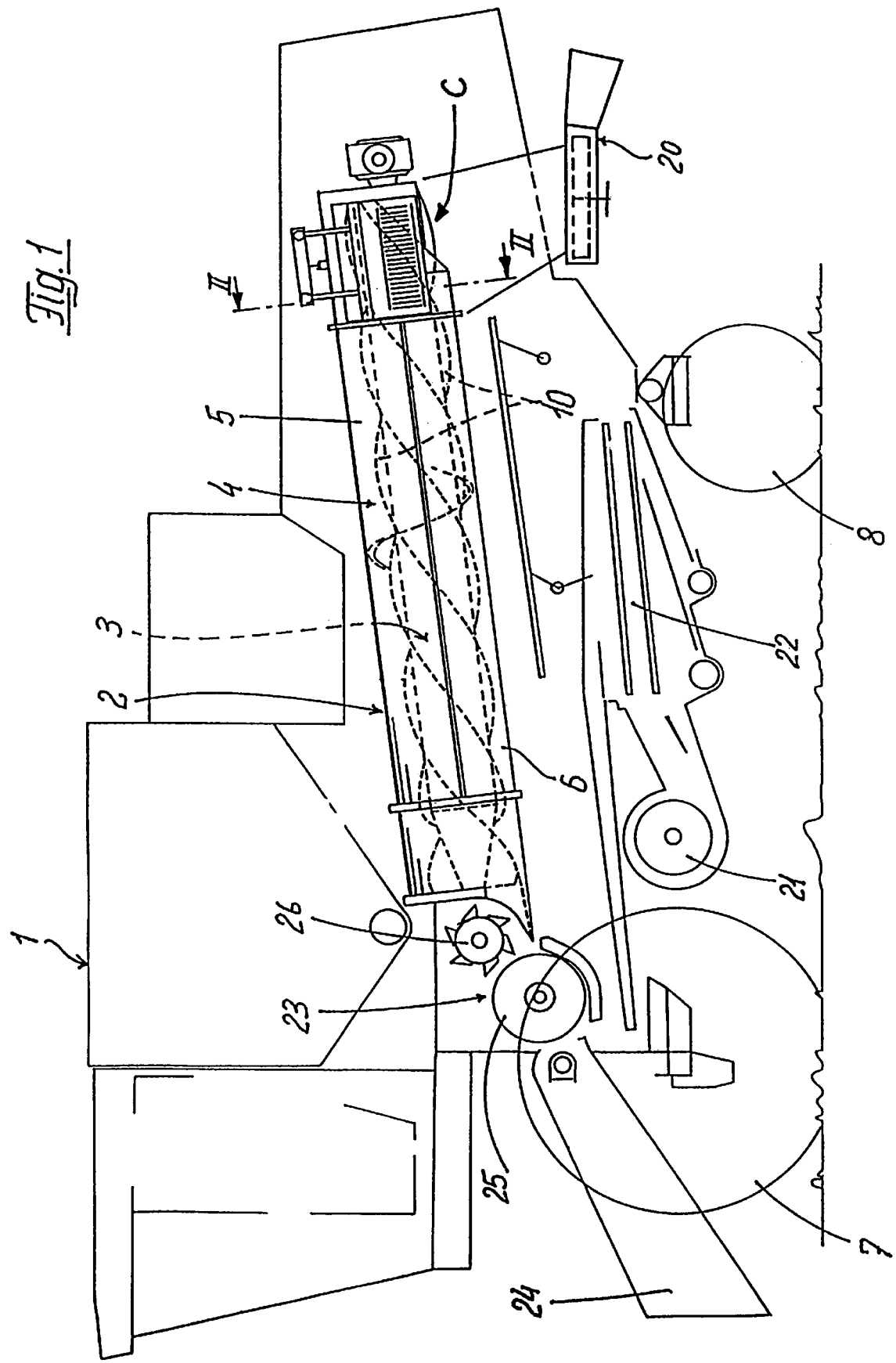
FIG. 1 is a schematic partial side view of a combine harvester embodying the present invention.

The combine harvester 1 shown partially in FIG. 1 is equipped with a separating device 2 whose operation applies the axial-flow method, which essentially includes a single separating rotor 3 or two parallel-axis separating rotors 3. The separating rotor 3 or rotors 3 are surrounded by a housing 4, having an upper portion in the form of a hood 5 and a lower portion in the form of a separating cage 6. In the embodiment shown, the axis of rotation of each separating rotor 3 is located transversely to the axles of the pairs of wheels 7 and 8. The conveying direction of each separating rotor 3 is opposite the direction of forward travel (i.e. rearwardly). Further, the axis of rotation of each separating rotor 3 is at an angle upwardly toward the rear, output end of the separating rotor 3.

To continuously transport the threshed material, a plurality of helically or spirally extending conveying strips 10 are mounted on the main body 9 of the separating rotor 3.

Figure 2:
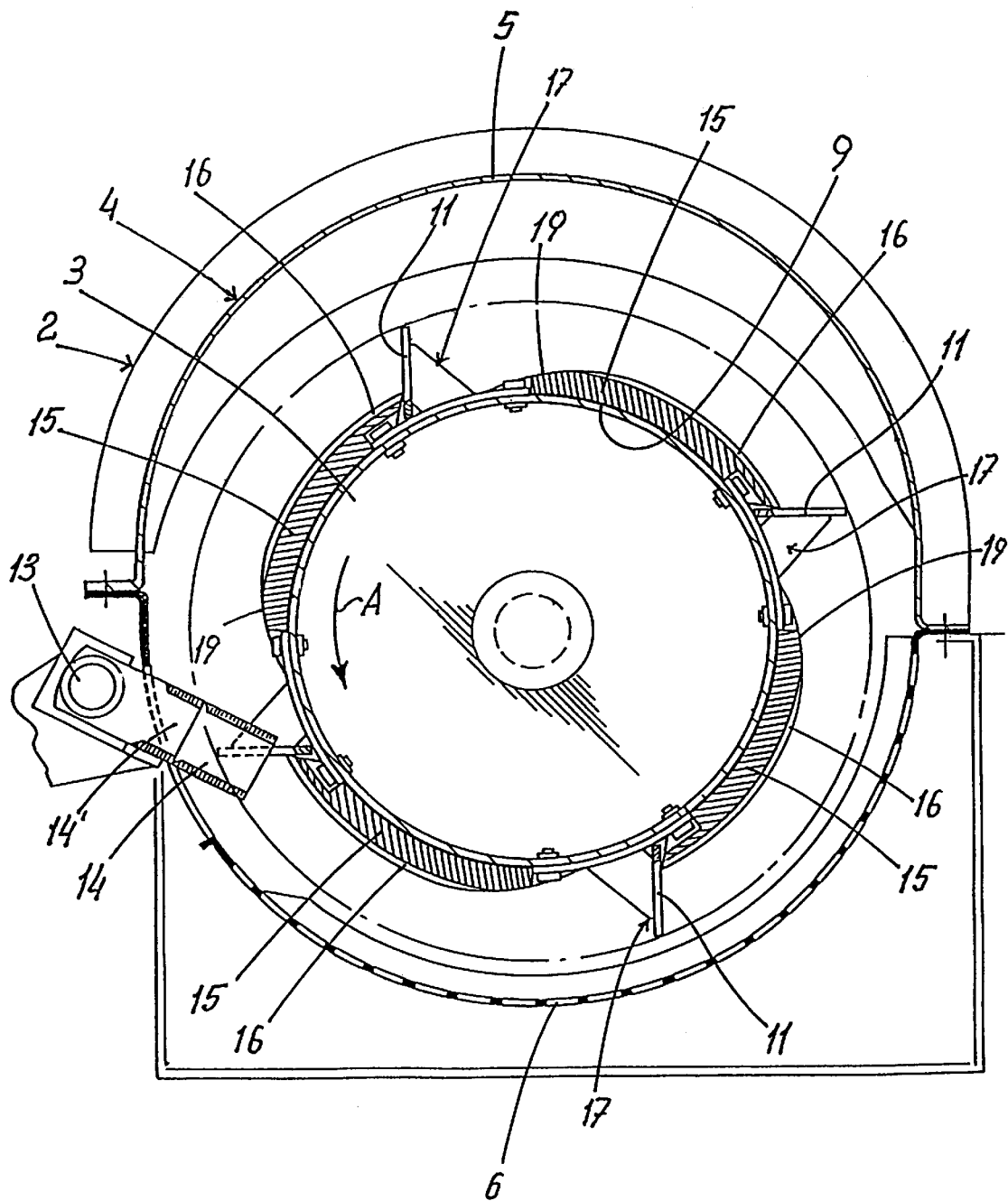
FIG. 2 is a cross sectional view taken generally along the line II—II in FIG. 1.
Figure 4:
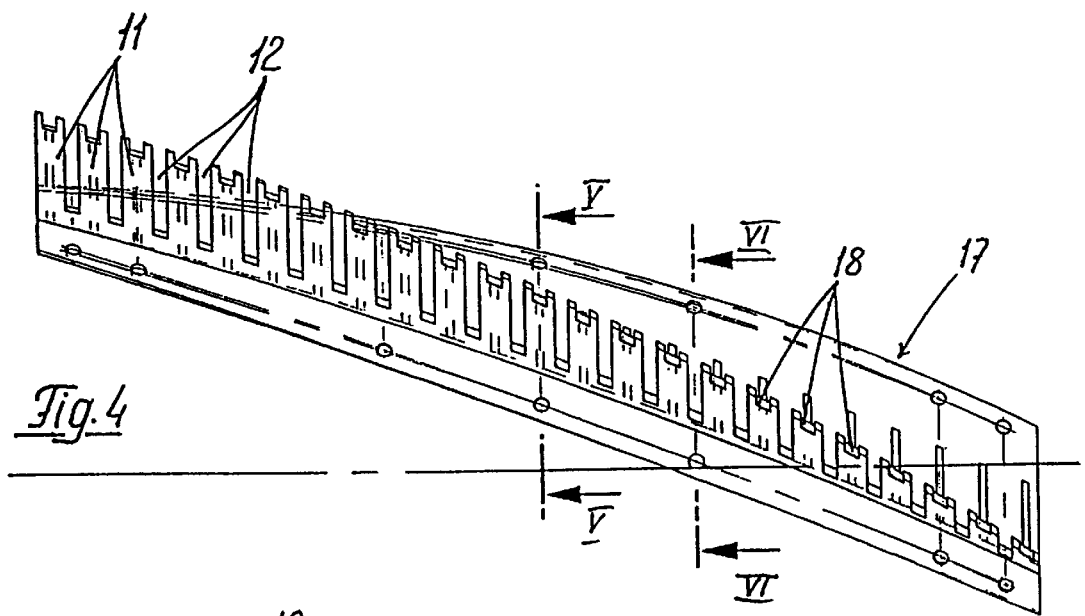
FIG. 4 is a elevational view as seen from the direction of arrow IV in FIG. 3.

At the discharge end of each separating rotor 3 is an axial-flow chopper device C for chopping the straw, which will be described in more detail. In the region of the axial-flow chopper device C are a plurality of rows of impact teeth 11, conveniently four in number as shown in FIG. 2, mounted on the main body 9 of the separating rotor 3. The rows extend helically or spirally and the teeth 11 are spaced to form radial slots 12 as best seen in FIG. 4. A receiving shaft 13 having an axis parallel to the axis of rotation of each separating rotor 3 runs on the outside of the separating device 2 and carries chopper blades 14 arranged in a row and passing through the radial slots 12 of each separating rotor 3. The impact teeth 11 are positioned to maintain the axial conveying action, as they continue the helix or spiral of the conveying strips 10. Releasably mounted filler bodies 15 are located between the rows formed from the impact teeth 11 on the main body 9 of each separating rotor 3. The filler bodies 15 have cutting channels 16 provided on the outer side facing away from the main body 9 and, together with the radial slots 12 of the impact teeth 11 form radial grooves, so that the free ends of the chopper blades 14 enter the cutting channels 16.

Figure 3:
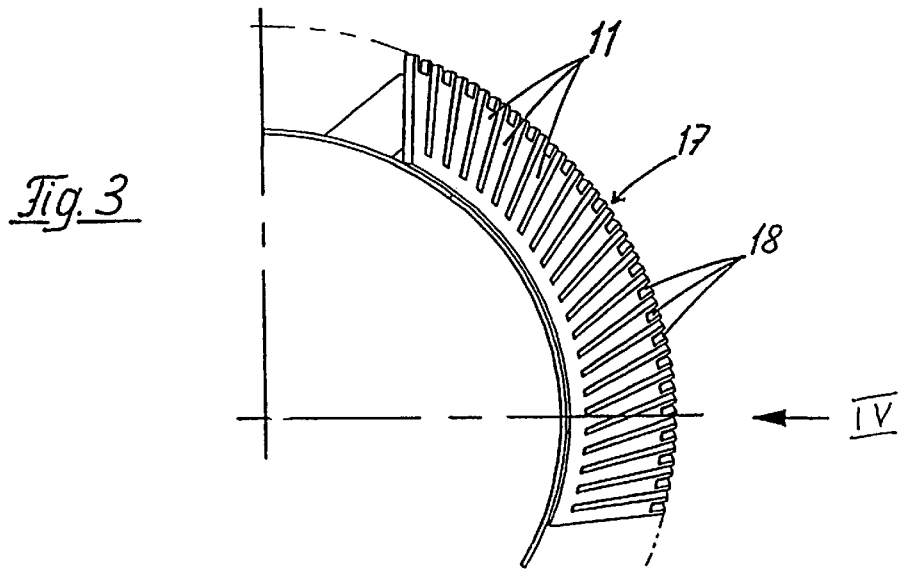
FIG. 3 is a partial front view of a separating rotor.
Figure 5:
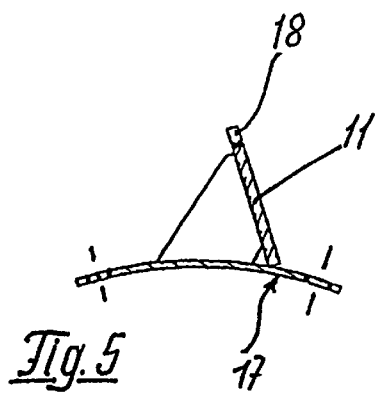
FIGS. 5 and 6 are cross sectional views taken generally along lines V—V and VI—VI respectively in FIG. 4.
Figure 6:
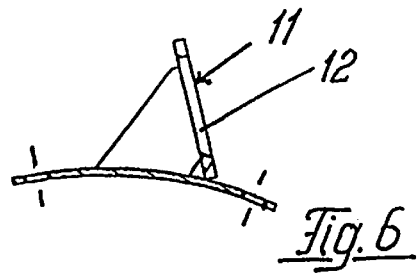

FIGS. 3 to 6 show an embodiment where each row formed from the impact teeth 11 is constructed as a one-piece impact tooth functional part 17 which is shaped according to the arrangement of conveying strips 10, so that the two longitudinal edges run helically or spirally. FIGS. 2 and 3, in particular, show that the impact tooth functional part 17 comprises part of a circular ring. Furthermore it can be seen that in the region of the longitudinal edges, the impact tooth functional part 17 is releasably connected by bolts to the main body 9 of the separating rotor 3. For this purpose the impact teeth 11 are provided with a flange matching the contour of the main body 9. FIGS. 3 and 4 in conjunction with FIG. 5 show that the outer ends of the impact teeth 11, which face away from the axis of rotation of the separating rotor 3, are provided with cutting grooves 18 whose depths are relatively small. In order to reduce the length of the chopped material, the receiving shaft 13 could also be equipped with a corresponding number of shorter chopper blades 14' (see FIG. 2). As desired, moreover, the radial slots 12 and the cutting grooves 18 may be advantageously used selectively according to a convenient system. For example each radial slot 12 can be assigned one chopper blade 14 and every second or third cutting groove 18 within the row could be assigned a further chopper blade 14'. From contrasting FIGS. 6 and 4, it can be seen that the depths of the radial slots 12 are distinctly greater than those of the cutting grooves 18, so that the bottom of each radial slot 12 is a shorter distance from the axis of rotation of the separating rotor 3 than the bottom of each cutting groove 18. As a result, chopper blades of different length are necessary to ensure that the edges or points facing towards the axis of rotation of the separating rotor 3 are as close as possible to the bottom of each cutting groove 18 or to the bottom of each radial slot 12. For reasons of simplifying the drawing, FIG. 3 shows only a partial front view of the region over an impact tooth functional part 17. In the embodiment shown in FIG. 3 a single (i.e. integral) impact tooth functional part 17 forms each row of impact teeth 11. A single row of impact teeth 11 with a relatively longer length could serve the function of several illustrated impact tooth functional parts 17. FIG. 2 shows that, in the direction of rotation of the separating rotor 3 indicated by arrow A, the filler bodies 15 are in a wedge shape on the longitudinal side located behind the rows of impact teeth 11 in order to ensure a continuous transition of the chopped material into the chopper region.

FIGS. 7 to 10 show a one-piece construction of the filler bodies 15. The two opposite longitudinal edges extend according to the helical or spiral arrangement of the impact teeth 11 on the separating rotor 3. The cutting channels 16 are arranged at a uniform distance from each other and at an angle to the longitudinal edges, but aligned with the radial slots 12 defined by the impact teeth 11. FIGS. 9 and 10 show that each filler body 15 is a semi-circle in cross-section, as the hatched areas show. Advantageously the filler bodies 15 may be made from metal, such as cast metal, or from plastic, such as a molded thermoset resin. Moreover FIGS. 2, 9 and 10 illustrate that the filler bodies 15 are flattened in a wedge shape in the front edge region of the separating device 2 in the direction of rotation A of the separating rotor 3, which is located behind the rows of impact teeth 11 to ensure a continuous transition of the chopped material out of the front rotor region into the chopping device. This flattened region or wedge shape is indicated by reference number 19. As FIG. 2 shows, the filler bodies 15 are bolted to the main body 9 of the separating rotor 3 by means of bolts with countersunk heads. Moreover, at both longitudinal edges (see FIG. 8), the filler bodies 15 are provided with recesses for the bolts which secure the impact tooth functional part 17.

Figure 11:
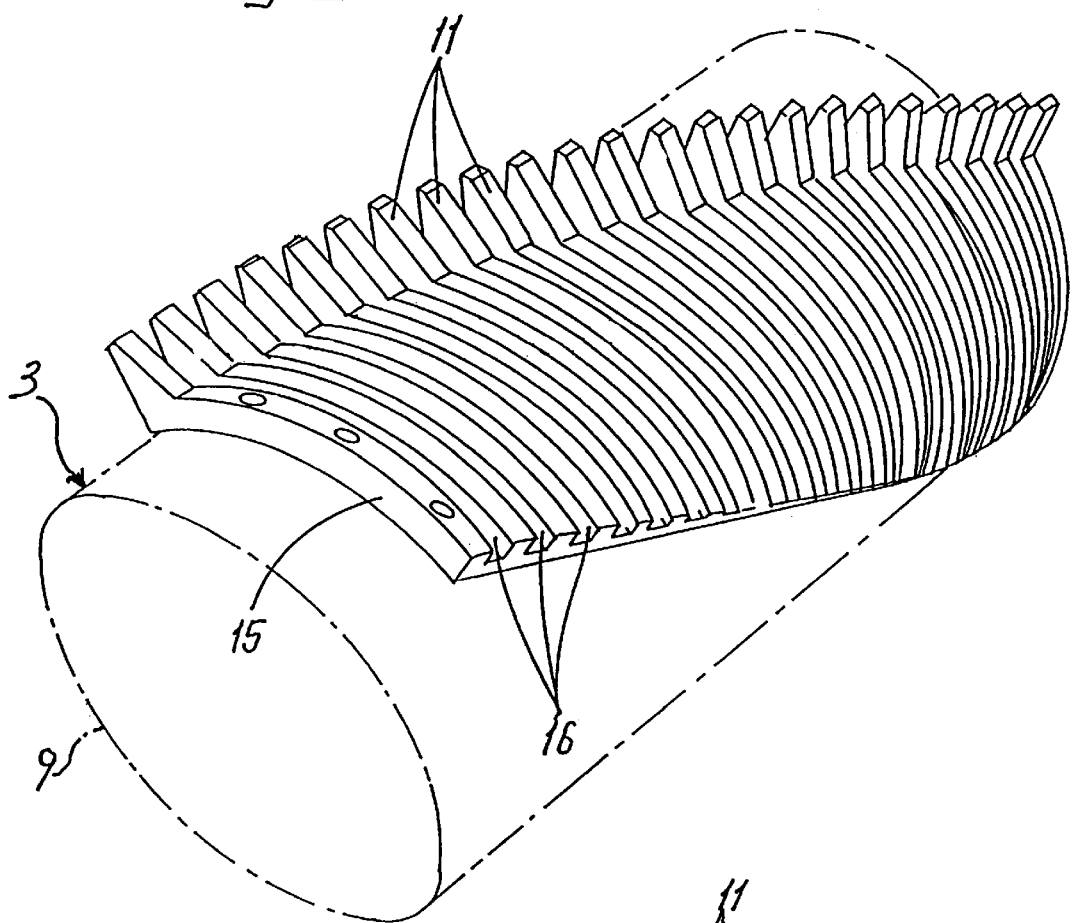
FIG. 11 is a perspective view of another embodiment showing the impact teeth integral with the filler body.
Figure 12:
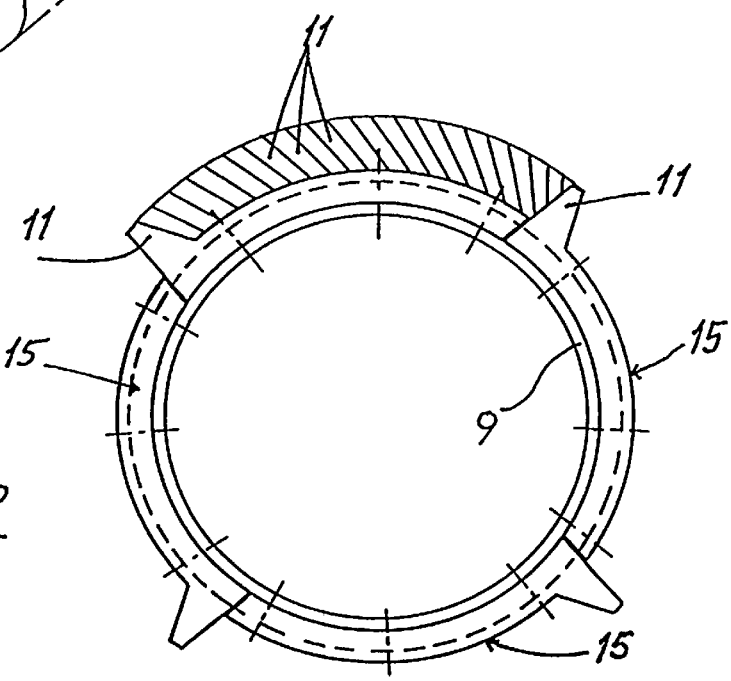
FIG. 12 is an end view of a separating rotor constructed of the FIG. 11 embodiments.

FIG. 11 shows an interrelationship of the impact teeth 11 and the filler bodies 15. It is apparent that the impact teeth 11 within the row are angularly offset from each other, and that the filler bodies 15 extend over a constant amount so that their longitudinal edges are shaped according to the shape of the impact teeth 11. Also the embodiment of FIGS. 11 and 12 shows that the impact teeth 11 and an adjacent filler body 15 form a one-piece or integral molding, thereby minimizing the number of components. For reasons of simplification only one row of impact teeth 11 is shown in FIG. 11.

In the embodiments shown the separating rotor 3 is advantageously provided with four rows of impact teeth 11. However, the separating rotor 3 can also be fitted with a different number of rows of impact teeth. FIG. 2 shows further that the housing 4 above the rotors 3, more or less starting from the horizontal center axis of the rotor 3, occupies a greater distance from the separating rotor 3 than the remainder of the casing on the bottom side, thus forming a further annular gap which narrows in the direction of rotation towards the chopper blades 14. As a result, the material to be conveyed passes into the chopper blades 14 in compacted form. FIG. 2 shows moreover that the chopper blades 14 at two mutually opposed longitudinal edges comprise cutting edges.

FIG. 1 further shows that behind the separating rotor 3 is a distributing device or rotary spreader 20 for the chopped material. The combine harvester 1, shown only partially in FIG. 1, is further equipped with a blower 21 and a sieve device 22 located under the separating rotor 3. Moreover, the combine harvester 1, in a manner well known in the art, is equipped with a cutterbar (not shown) and a sloping conveyor or elevator 24 which transfers the cut material to a threshing mechanism 23. Only the rear end of the sloping conveyor 24 is shown in FIG. 1. The threshing mechanism 23 contains a threshing drum 25 and a transfer drum 26 which is mounted directly in front of the feed end of the separating rotor 3 and transversely to the separating rotor's 3 axis of rotation. In contrast to the embodiment shown, however, the axis of rotation of the separating rotor 3 could be parallel to the axles of the pairs of wheels 7 and 8.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a combine harvester for harvesting crops and having a cutterbar; a sloping conveyor which transports the cut material away; a threshing mechanism mounted behind the sloping conveyor; a separating device including a separating rotor having a main body and equipped with spiral conveying elements; a plurality of impact teeth which form a continuation of the spiral conveying elements of each separating rotor within a given region of a conveying zone and continue the spiral; and a plurality of radial slots located between the impact teeth; the improvement comprising:
   an impact tooth functional part forming a spirally extending row of the impact teeth, and means for releasably attaching the impact tooth functional part to the main body of the separating rotor.

2. A combine harvester according to claim 1, wherein said separating device is constructed and arranged to operate in an axial flow manner.

3. A combine harvester according to claim 1, wherein said impact tooth functional part formed from the impact teeth of one row is constructed as one piece.

4. A combine harvester according to claim 1, including filler bodies arranged on the main body of the separating rotor between the rows of impact teeth, said filler bodies having cutting channels on the outside, said filler bodies being constructed in one piece, and means for releasably attaching the filler bodies to the main body of the separating rotor.

5. A combine harvester according to claim 4, including means for releasably attaching the filler bodies to an adjacent impact tooth functional part.

6. A combine harvester according to claim 4 wherein said filler bodies are made from a metallic material.

7. A combine harvester according to claim 4, wherein said filler bodies are made from plastic.

8. A combine harvester according to one claim 4, wherein said filler bodies are flattened on a longitudinal side located behind the row of impact teeth, seen in a direction of rotation of the separating rotor.

9. A combine harvester according to claim 1, including stationary chopper blades mounted adjacent the separating rotor, and wherein said impact teeth are provided with cutting grooves at their outer circumferential surfaces for passage of the stationary chopper blades.

10. A combine harvester according to claim 9, wherein the impact teeth have radial slots, and wherein the depths of the cutting grooves are substantially smaller than the depths of the radial slots so that a distance from a bottom of each cutting groove to an axis of rotation of the separating rotor is greater than the distance from the bottom of each radial slot to the axis of rotation of the separating rotor.

11. A combine harvester according to claim 4, wherein the impact teeth have radial slots, and wherein the bottom of each said cutting channel of the filler body is approximately the same distance from an axis of rotation of the separating rotor as the bottom of each radial slot.

12. A combine harvester according to claim 4, wherein the impact tooth functional part and the adjacent filler body located behind it, as seen in a rotation of rotation of the separating rotor, are integrally formed into a one-piece part.

13. A combine harvester according to claim 12, wherein the integral, one-piece part is a molding.

14. A combine harvester according to claim 1, including a separating cage, and a housing a region of the impact teeth of the separating rotor and having an upper cover which widens from the connection with the separating cage to a central upper region.

15. A combine harvester including a separating device including a separating rotor having a main body and equipped with spiral conveying elements; an impact tooth functional part forming a spirally extending row of impact teeth which form a continuation of the spiral conveying elements of the separating rotor within a rearward region of the separating rotor and continue the spiral; a plurality of radial slots located between the impact teeth; and means for releasably attaching the impact tooth functional part to the main body of the separating rotor.

* * * * *